Oct. 20, 1959 — M. PETTY — 2,909,230
FAN BLADE COUPLING

Filed Oct. 27, 1954 — 2 Sheets-Sheet 1

Macon Petty
INVENTOR.

BY
ATTORNEYS

United States Patent Office 2,909,230
Patented Oct. 20, 1959

2,909,230

FAN BLADE COUPLING

Macon Petty, Houston, Tex., assignor to Hudson Engineering Corporation, Houston, Tex., a corporation of Texas Application October 27, 1954, Serial No. 464,963

8 Claims. (Cl. 170—173)

This invention relates to the coupling of fan blades to hubs and, more particularly, to apparatus which enables the maintenance of a blade at a predetermined pitch during such coupling. In one of its aspects, this invention relates to such apparatus which is particularly well suited for the coupling of fan blades having hollow plastic shanks.

It is conventional practice in various industries which employ fans to provide the blades with shanks which are coupled to the hub in such a manner that the pitch of the blades may be adjusted as desired. For this purpose, clamps are releasably compressed radially about the shanks by bolting, set screws, or the like, to hold them in an immovable position. Since it is a practical impossibility with known devices of this type to exert these forces evenly about the circumference of the shank, closing of the clamp invariably causes rotation of the blade shank. That is, there is a frictional drag upon the shank during the tightening up of the clamp between a snug or initial engagement about the shank and the final immovable setting thereof.

It will be appreciated that since the amount of drag upon or rotation of the blade shank, even though small, cannot be predicted, a truly accurate predetermined setting of the pitch of the blade cannot be obtained. The problem is most acute in the manual changing of the blade pitch to meet various operating conditions wherein time is an important factor.

It is further the practice in certain applications to use relatively lightweight hollow plastic blades. As a result of one method of manufacturing such blades, the shank of the blade is likewise hollow. Not only are these hollow shanks incapable of supporting considerable clamping pressure, but also they are highly susceptible to distortion by an unequal distribution of pressures when clamped within conventional devices.

It is an object of this invention to provide a means by which the preset pitch of the blade may be maintained as it is finally clamped immovably in place.

Another object is to provide apparatus which is operable to exert pressure radially uniformly between the blade shank and clamp as the former is finally clamped into position.

Still another object is to provide apparatus for coupling a fan blade to a hub by moving a tapered shank of the blade axially within a correspondingly tapered clamp on the hub from an initial engagement therewith to a finally clamped position therein.

Another object is to provide a coupling apparatus in which the pitch of the blade may be adjusted by manipulation of only a single member.

Yet another object is to provide apparatus which will permit the coupling of a fan blade having a hollow plastic shank to a hub without distorting or otherwise injuring the shank, and further without disturbing the preset pitch of the blades.

A still further object is to provide apparatus which will accomplish each of the foregoing objects and at the same time enable the use therewith of conventional type blades with only minor alterations thereto.

Other and further objects of this invention will appear as the description proceeds.

In the accompanying drawings forming a part of the instant specification and wherein like reference numerals are used in the various views to indicate like parts:

Figure 1:
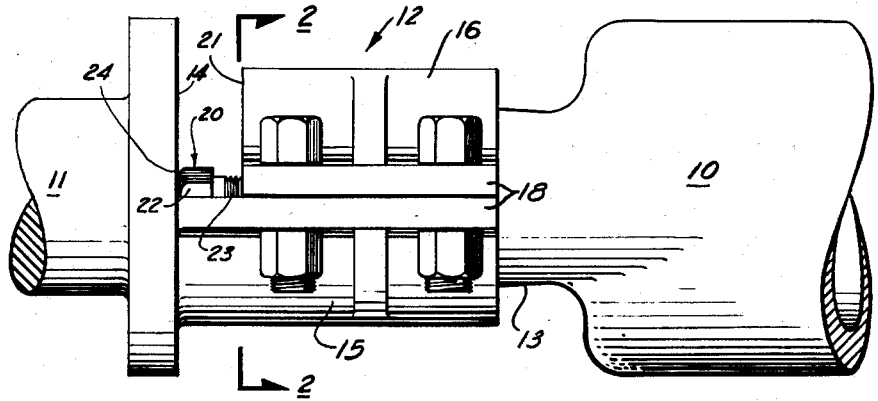
Fig. 1 is a side view showing a fan blade coupled to a hub by means of the novel apparatus of the present invention.

The novel apparatus of this invention includes a clamp having a housing on a hub, a shank on a fan blade receivable within an opening through the clamp housing, and force transmitting means cooperable between the clamp and shank for moving the latter axially into a finally clamped position within the housing opening. Each of the housing openings and blade shanks is correspondingly tapered so that when the shank is moved into mating relation with the housing, forces are distributed radially uniformly therebetween. As a result, there is no tendency for the shank to be rotated within the housing as it is moved from its initial engagement therewith to its finally clamped position. In this manner, the pitch of the blade may be preset at the initial engagement and maintained as the blade is clamped immovably in place. Further, the pitch of the blade may be readily adjusted without the necessity of loosening and subsequently tightening several bolts or the like by merely manipulating the force transmitting means to back the shank off from its finally clamped position to one in which the blade may be manually rotated within the clamp, and then returning the shank to finally clamped position by moving it axially into the tapered clamp.

The tapers are outwardly convergent from the hub so that the transmitted force as well as the outward thrust of the blade in motion is directed against and resisted by such taper. Although similarly tapered shanks and clamps may have been provided in connection with prior coupling devices, they were for the sole purpose of resisting thrust and did not provide the uniform distribution of clamping pressures provided by the apparatus of this invention.

Furthermore, in accordance with another advantage of this invention, these blades, as well as those having non-tapered shanks, require only the alterations described below to implement my improved coupling apparatus.

The clamp housing is made up of two members, a first of which is secured to the hub and a second releasably secured to said first member, such that the blade shank may be removed therefrom, and is provided with an abutment which faces the housing opening and the blade shank received therein in position to cooperate with the aforementioned force transmitting means for moving the blade shank axially of the opening. Preferably, this force transmitting means comprises a rotatable part having a surface at one end engageable with the abutment and a connection at its opposite end with a threaded opening at the end of blade shank to provide therebetween a jack screw arrangement. An opening is provided through the housing intersecting the tapered opening for access to an actuator for the force transmitting means.

Although it is contemplated that the apparatus of this invention may be used in connection with blades formed of most any solid material, one embodiment to be described hereinafter has been found especially well suited for use with blades having hollow plastic shanks. In this particular embodiment, a resilient element is receivable within the hollow shank to prevent its collapse under clamping pressures, and is threadedly connected to the force transmitting means to distribute the effect of such means uniformly about the inner portion of the hollow shank.

With reference now particularly to the illustrative embodiments in the drawings, there is shown in Fig. 1 a portion of a fan blade 10 which is coupled to a radially projecting portion 11 of a hub by means of the apparatus of this invention which includes a clamp 12 on the hub and a tapered shank 13 on the blade received within the clamp. The blade and its shank may be of metal, wood or plastic material.

Figure 2:
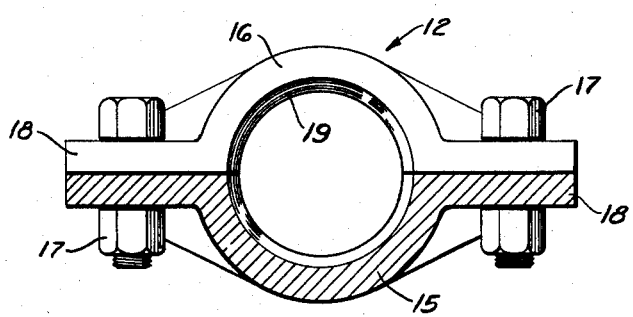
Fig. 2 is a cross-sectional view of the clamp of Fig. 1, with the fan blade removed and taken substantially along broken line 2—2 of Fig. 1.
Figure 3:
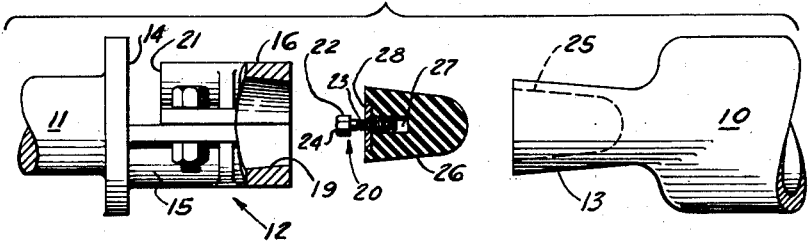
Fig. 3 is an exploded view on a reduced scale of one embodiment of this invention.

From this Fig. 1, it can be seen that an abutment 14 is formed on the outer face of a flange of hub portion 11 and that the clamp housing comprises a lower member 15 secured to this flange and an upper member 16 releasably secured to the first member by the bolting together as at 17 of flanges 18 on each of said members. As indicated in Figs. 2 and 3, these clamp members have inner surfaces which define an opening 19 therethrough opposite and facing the abutment 14 and tapered correspondingly to the shank 13 received therein. As shown, the clamp and housing are so constructed as to define a space between the abutment 14 and blade shank 13 when the latter is in engagement with the opening 19, in which space the force transmitting means, designated in its entirety by the numeral 20, is disposed.

An opening 21 is provided through the clamp housing to permit access to an actuator 22 on a rotatable part 23 of the force transmitting means. As will be understood more fully hereinafter, said part is engageable with one of the housing abutment and blade shank and threadedly connected to the other such that with the threadedly engaged of the members disposed in a non-rotative position, the force transmitting means is selectively extendible or retractable upon rotation of actuator 22. Upon extension of such means, the blade shank is moved axially into finally clamped position within the similarly tapered housing opening to exert thereon forces which are distributed uniformly radially between the shank and opening.

The above described clamp construction is common to each of the illustrative embodiments of this invention, the differences lying in the construction of the blade shank and the force transmitting means 20 cooperable therewith to move the shank. In this regard, it is preferred that the threaded connection of rotatable part 23 be with the shank and that it be provided with a head 24 at its end opposite the threaded connection for engagement with abutment 14. In this manner, the blade shank is rendered non-rotative by its engagement with the housing opening and the jack screw arrangement is removable with the blade.

It will also be noted that it is a feature common to each of these embodiments that a conventional fan blade need only be altered as to its tapered shank for reception of the force transmitting means. In fact, except for the embodiment shown in Fig. 3, this alteration comprises principally the provision of an axially disposed bore in the end of the shank.

Referring first to this Fig. 3 embodiment, it can be seen that the fan blade shank is hollow to provide a recess 25 tapered convergently inwardly from the shank end and extending axially and concentrically thereof. To illustrate certain advantages of this invention, it is contemplated that this shank may be of plastic material. Adapted to be received within and mated with the recess is a plug member 26 of any suitable resilient material, such as rubber, and approximately coextensive in length with the recess so as to be substantially flush with the end of the blade shank.

At its outer end, the plug 26 is bored axially as at 27 and carries a metallic disc 28 having a threaded opening concentrically therethrough. As shown in Fig. 3, the rotatable part 23 is threaded for connection with the disc 28 and extends into the bore 27. It will be understood from the foregoing that with the parts assembled as indicated in Fig. 3, the frictional engagement of the plug 26 within the recess 25 will permit the actuator 22 to be manipulated to force the tapered shank outwardly into initial and relatively tight engagement with the tapered housing opening 19. At this time, the pitch of the blade may be set as desired and the actuator further manipulated to force the shank into finally clamped position.

Figure 4:
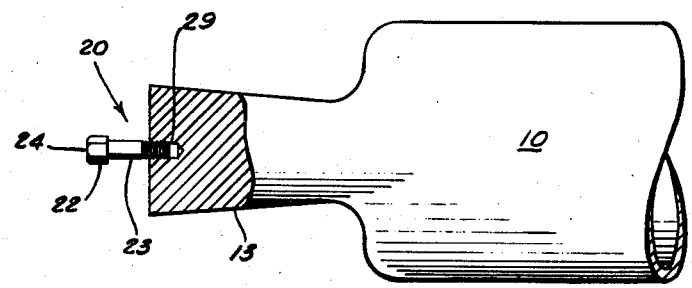
Figs. 4 to 6 are detailed views, partially in section, of various embodiments of blade shanks cooperable with the clamp shown to the left in Fig. 3.
Figure 5:
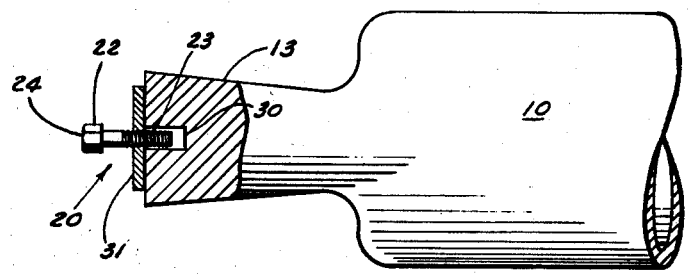
Figure 6:
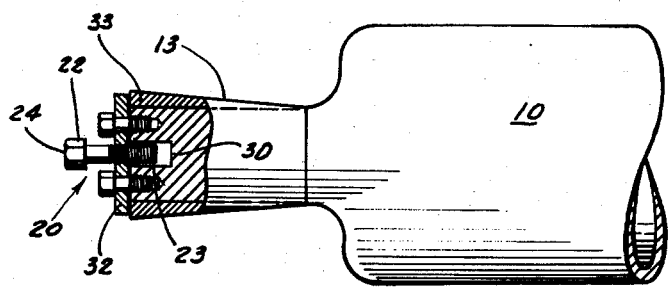

Although the resilient plug is well suited for uniformly distributing the radially directed forces between the force transmitting means and the distortable hollow plastic shank, as well as between the shank and clamp housing opening, a simpler coupling apparatus may be used in connection with solid shanks, whereby the force is transmitted directly to the blade shank, as shown in the embodiments of each of Figs. 4 to 6.

In the embodiment of Fig. 4, the fan blade may be of a relatively hard plastic material, wood or metal, such that a bore 29 axially of the shank 13 thereof may be threaded for connection with rotatable part 23 of the force transmitting means 21. It is obvious that this embodiment is the simplest and is preferred from that standpoint.

In the Fig. 5 embodiment, an axial bore 30 is enlarged to freely receive the rotatable part 23 and a separate disc 31 is threaded axially for connection with part 23 and bears against the end of the shank when the blade shank is moved into engagement with the housing opening. Thus, this disc is made non-rotatable similar to the blade shank such that rotation of part 23 provides the axial extension of the force transmitting means.

The Fig. 6 embodiment is similar to that of Fig. 5 in that the rotatable part 23 is freely received within an axial bore 30 in the end of the blade shank and threadedly connected to a disc 32 bearing against said shank end. However, in this embodiment there is illustrated a shank which, similar to one type of conventional construction, is of a continuous diameter, or at least a diameter not corresponding to that of the clamp housing opening. A ferrule or bushing 33 having on its exterior the desired taper corresponding to the taper of the clamp housing opening is slipped over the blade shank and retained thereon by the disc 32 which is bolted or otherwise secured in bearing relation on the shank end.

In addition to accommodating blades having non-tapered shanks for use with the apparatus of this invention, it will be appreciated that a series of bushings 33 may be provided for use with clamps having housing openings of different sizes. Also, of course, suitably shaped shims (not shown) may be used in connection with the tapered blade shanks to accommodate them for use with differently sized clamps.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In combination, a fan blade having a shank tapered divergently away from the blade portion thereof and a correspondingly tapered recess extending axially and concentrically into the end of the shank, a plug member having a resilient surface shaped for mating with the blade shank recess, and a part threadedly connected to said plug member for imparting force thereto in a direction axially thereof.

2. The combination set forth in claim 1, wherein the blade shank is formed of a plastic material.

3. Apparatus coupling a fan blade to a hub, comprising a housing connectable to the hub and having an opening therethrough, a shank on the blade received in the housing opening, a part on the shank engageable with a complementary part on the periphery of the housing opening to prevent removal of said shank outwardly through said opening in any rotative position of the shank, said blade shank being rotatable about an axis within said housing opening when initially engaged therewith to permit the blade to be set at any desired pitch about its axis, an abutment having a wall extending substantially transversely of the rotatable axis of the blade shank, and rotatable force transmitting means engageable with said wall and blade shank, respectively, and extendible therebetween in a direction longitudinally of the blade for moving said shank away from the wall from its initial to a fixed mating engagement with said opening while maintaining the blade in said desired pitch.

4. The apparatus of claim 3, wherein said force-transmitting means includes a jack screw having one end abuttable with the wall and the other end threadedly carried by the blade shank.

5. The apparatus of claim 3, wherein said housing comprises a pair of longitudinally split members, and means for releasably securing said members to one another to permit the blade shank to be removed from the housing opening.

6. The apparatus of claim 5, wherein said force-transmitting means is carried by the blade shank for removal therewith.

7. The apparatus of claim 3, wherein said housing is provided with an access opening intersecting the blade shank receiving opening, and said force-transmitting means is provided with an actuator in position to permit manipulation thereof through said access opening.

8. The apparatus of claim 3, wherein the end of the blade shank is recessed concentrically of its taper and receives a resilient plug therein, and said force-transmitting means is extendible and retractable in engagement with the abutment and plug.

References Cited in the file of this patent

UNITED STATES PATENTS

| | | |
|---|---|---|
| 787,084 | Donnelly | Apr. 11, 1905 |
| 1,661,631 | Nixon | Mar. 6, 1928 |
| 1,769,801 | McCauley | July 1, 1930 |
| 2,563,020 | Gemeinhardt | Aug. 7, 1951 |

FOREIGN PATENTS

| | | |
|---|---|---|
| 446,744 | Great Britain | June 3, 1937 |
| 463,535 | Great Britain | Apr. 1, 1937 |
| 543,177 | Great Britain | Feb. 13, 1942 |